(12) United States Patent
Rosenwood et al.

(10) Patent No.: US 12,453,438 B2
(45) Date of Patent: Oct. 28, 2025

(54) SOFTWARE APPLICATION AND COMPUTER SYSTEM FOR USING PERSONAL RECEPTACLES

(71) Applicant: STARBUCKS CORPORATION, Seattle, WA (US)

(72) Inventors: Angela M. Rosenwood, Seattle, WA (US); Jane J. Tsilis, Sammamish, WA (US)

(73) Assignee: Starbucks Corporation, Seattle, WA (US)

( * ) Notice: Subject to any disclaimer, the term of this patent is extended or adjusted under 35 U.S.C. 154(b) by 696 days.

(21) Appl. No.: 17/881,075

(22) Filed: Aug. 4, 2022

(65) Prior Publication Data

US 2024/0041247 A1  Feb. 8, 2024

(51) Int. Cl.
   *A47J 31/52* (2006.01)
   *B67D 1/08* (2006.01)
   *G06Q 10/30* (2023.01)
   *G06Q 50/12* (2012.01)

(52) U.S. Cl.
   CPC .......... *A47J 31/521* (2018.08); *B67D 1/0888* (2013.01); *G06Q 50/12* (2013.01); *G06Q 10/30* (2013.01)

(58) Field of Classification Search
   CPC ........ G06Q 50/12; G06Q 20/20; G06Q 20/18; G07F 13/06; G07F 13/065; A47J 31/521; B67D 1/0888
   See application file for complete search history.

(56) References Cited

U.S. PATENT DOCUMENTS

| | | | |
|---|---|---|---|
| 2010/0242497 A1* | 9/2010 | Bertone | A23G 9/28 62/344 |
| 2013/0024299 A1* | 1/2013 | Wong | G06Q 50/12 705/15 |
| 2015/0088620 A1 | 3/2015 | Wittek | |
| 2015/0097769 A1* | 4/2015 | Russell | A47G 19/2227 345/545 |

(Continued)

FOREIGN PATENT DOCUMENTS

WO  2024030295 A1  2/2024

OTHER PUBLICATIONS

PCT/US2023/028647; International Search Report and Written Opinion dated Nov. 17, 2023, 10 pages.

(Continued)

*Primary Examiner* — Timothy R Waggoner
(74) *Attorney, Agent, or Firm* — Kilpatrick Townsend & Stockton LLP (57) ABSTRACT

Some examples described herein involve a system that can receive a request for a beverage transmitted by a software application. The request can indicate that a requestor of the beverage is to receive the beverage in their personal receptacle. The system can generate a digital instruction to create the beverage based on the request, where the digital instruction is configured to prevent the beverage from being dispensed in a single-use container and to cause the beverage to be provided to the requestor in the personal receptacle. The system can then output a beverage build instruction corresponding to the digital instruction. The beverage build instruction can cause an entity at a production location to create the beverage and provide the beverage to the requestor in the personal receptacle.

17 Claims, 7 Drawing Sheets

(56) References Cited

U.S. PATENT DOCUMENTS

| | | |
|---|---|---|
| 2019/0251522 A1 | 8/2019 | Wallis |
| 2020/0342487 A1* | 10/2020 | Greenberger ...... G06Q 30/0233 |
| 2021/0241238 A1 | 8/2021 | Sperry |
| 2023/0177910 A1* | 6/2023 | Sueyoshi ............... G06Q 50/10 |
| | | 700/232 |
| 2023/0364284 A1* | 11/2023 | Sperry ..................... A61L 2/10 |
| 2024/0260781 A1* | 8/2024 | Mckee ................... G06Q 50/12 |

OTHER PUBLICATIONS

PCT/US2023/028647, "International Preliminary Report on Patentability", Feb. 13, 2025, 7 pages.
PCT/US2023/028647 , "International Search Report and Written Opinion", Nov. 17, 2023, 10 pages.
PCT/US2023/028647; Notification Concerning Availability of the Publication of the International Application dated Feb. 8, 2024, 42 pages.

* cited by examiner

SOFTWARE APPLICATION AND COMPUTER SYSTEM FOR USING PERSONAL RECEPTACLES

TECHNICAL FIELD

The present disclosure relates generally to sustainable technologies for the environment. More specifically, but not by way of limitation, this disclosure relates to a software application and corresponding computer system that can allow users to receive beverages in personal receptacles that are reusable.

BACKGROUND

Global warming and other environmental considerations are continually pushing entities to operate in more efficient, environmentally conscious ways. Significant resources may be devoted to finding new ways to reduce waste, for example by reusing existing equipment and working with others to do the same. This may involve creating and employing new technologies to facilitate these sustainability programs.

SUMMARY

One example of the present disclosure can include a system including one or more processors. The system can also include one or more memories including instructions executable by the one or more processors for causing the one or more processors to: receive a request for a beverage transmitted by a software application, the request indicating that a requestor of the beverage is to receive the beverage in a personal receptacle; generate a digital instruction to create the beverage based on the request, the digital instruction being configured to prevent the beverage from being dispensed in a single-use container and to cause the beverage to be provided to the requestor in the personal receptacle; and output a beverage build instruction corresponding to the digital instruction, the beverage build instruction being configured to cause an entity at a production location to create the beverage and provide the beverage to the requestor in the personal receptacle.

Another example of the present disclosure includes a method including receiving a request for a beverage transmitted by a software application, the request indicating that a requestor of the beverage is to receive the beverage in a personal receptacle; generating a digital instruction to create the beverage based on the request, the digital instruction being configured to prevent the beverage from being dispensed in a single-use container and to cause the beverage to be provided to the requestor in the personal receptacle; and outputting a beverage build instruction corresponding to the digital instruction, the beverage build instruction being configured to cause an entity at a production location to create the beverage and provide the beverage to the requestor in the personal receptacle. Some or all of the operations can be implemented by one or more processors.

Still another example of the present disclosure includes a non-transitory computer-readable medium comprising program code that is executable by one or more processors for causing the one or more processors to receive a request for a beverage transmitted by a software application, the request indicating that a requestor of the beverage is to receive the beverage in a personal receptacle; generate a digital instruction to create the beverage based on the request, the digital instruction being configured to prevent the beverage from being dispensed in a single-use container and to cause the beverage to be provided to the requestor in the personal receptacle; and output a beverage build instruction corresponding to the digital instruction, the beverage build instruction being configured to cause an entity at a production location to create the beverage and provide the beverage to the requestor in the personal receptacle.

DETAILED DESCRIPTION

Certain aspects and features of the present disclosure relate to a software application and a corresponding computer system that can allow a user to receive a beverage in a personal receptacle (e.g., cup or bottle) that is reusable. As one particular example, a user can interact with the software application to request a beverage from a production location. The software application can include a graphical user interface with a graphical option that is selectable by the user to receive the beverage in a personal receptacle. A personal receptacle can be any receptacle provided by the user to the production location for receiving a requested item, even if the user does not own the receptacle. For example, the receptacle may owned by a family member or friend. The user can select the graphical option and then submit the request. In response to the request, the computer system can generate a digital instruction to create the beverage. The digital instruction can include a command indicating that the beverage is to be provided to the user in their personal receptacle. The computer system can then transmit a beverage build instruction corresponding to the digital instruction. The beverage build instruction can prevent the beverage from being dispensed in a single-use container of the production location and instead cause the beverage to be dispensed in the user's personal container. In this way, the computer system can control dispensing of the beverage based on whether or not the user selected the graphical option.

It can be challenging to control the dispensing of beverages into the correct containers. This challenge has been amplified by mobile applications and the Internet, which allow a huge number of users to submit beverage requests relatively rapidly in a short time span. For example, hundreds of users may submit beverage requests via their mobile applications over the course of an hour, which may be difficult or impossible for a human to keep track of. When coupled with the possibility of some users wanting to use their own personal receptacles, the task can quickly become overwhelming.

Some examples of the present disclosure can overcome one or more of the abovementioned problems by using a computer system to automatically control the dispensing of beverages into containers. For example, the computer system can receive beverage requests from requestors, generate digital instructions based on the beverage requests, and then automatically transmit a beverage build instruction corresponding digital instruction at the production location. The beverage build instruction can link the beverage to the requestor as well as the type of container in which the beverage is to be dispensed. In some cases, the beverage build instruction can prevent the beverage from being dispensed into a single-use container of the production location in favor of the requestor's personal container. In other cases, the beverage build instruction may cause the beverage to be dispensed into a single-use container. Using these techniques, the computer system can organize the requests and pair beverages with corresponding containers, including personal containers of requestors, to help ensure the correct beverages are dispensed into the correct containers.

In some examples, the computer system can perform tracking operations to link the requestor's personal receptacle to the corresponding beverage prepared at a production location. For example, the computer system may receive a unique identifier of the personal receptacle and link it to a unique identifier of the beverage at the production location, so that the two can be paired together correctly. As the beverage makes its way through the production location, for example to different production stations, its physical location can be tracked. Likewise, the physical location of the personal container can be tracked through the production location. The tracking can help ensure that the correct beverage is dispensed into the personal receptacle. This can help reduce errors and lost beverages at the production location.

Some examples can provide additional technical advantages. For example, in the online context, it can be challenging to differentiate human users submitting valid beverage requests from automated bots (e.g., scripts) that may be submitting malicious requests. This is because the requesting entity is not physically present at the production location to submit the beverage requests; rather, the requests are submitted remotely via the Internet. This can make it relatively easy for automated bots to submit fake requests that consume the time and resources of production locations. But some examples of the present disclosure can use the personal receptacle option as a way to help validate that a beverage request is genuine. Beverage requests in which the personal receptacle option is selected are more likely to be genuine, because it can be more difficult for automated bots to interact with graphical interface elements and make this kind of selection. The computer system can make use of this fact by adjusting a validation score for the user based on whether the graphical option is selected. For example, the computer system may increase a validation score for the user if the graphical option is selected or may decrease a validation score for the user if the graphical option is not selected. Based on the validation score associated with a given beverage request, the computer system may automatically allow or reject the request. For example, the computer system may automatically reject beverage requests for which the corresponding validation score is below a predefined threshold.

In some examples, the computer system can act as a centralized coordination and control unit for the printers at various production locations. For example, the computer system can receive dozens of requests from various requestors, generate corresponding digital instructions, and then automatically control printers at multiple production locations to print corresponding physical instructions. In these examples, the physical instructions can serve as the beverage build instructions. In this way, the computer system can dynamically control the printers at multiple production locations to coordinate delivery of the requested beverages.

Using the technologies described herein, users can quickly and easily receive beverages in their personal receptacles. This can be better for the environment than providing each user with a different, single-use receptacle each time they request a beverage, which is the default approach at many production locations. Not only can the techniques described herein reduce waste, but they can also reduce the amount of energy and raw materials typically consumed by manufacturing single-use receptacles, because fewer of them are needed. Thus, the cumulative environmental benefit derived from these techniques can be significant.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
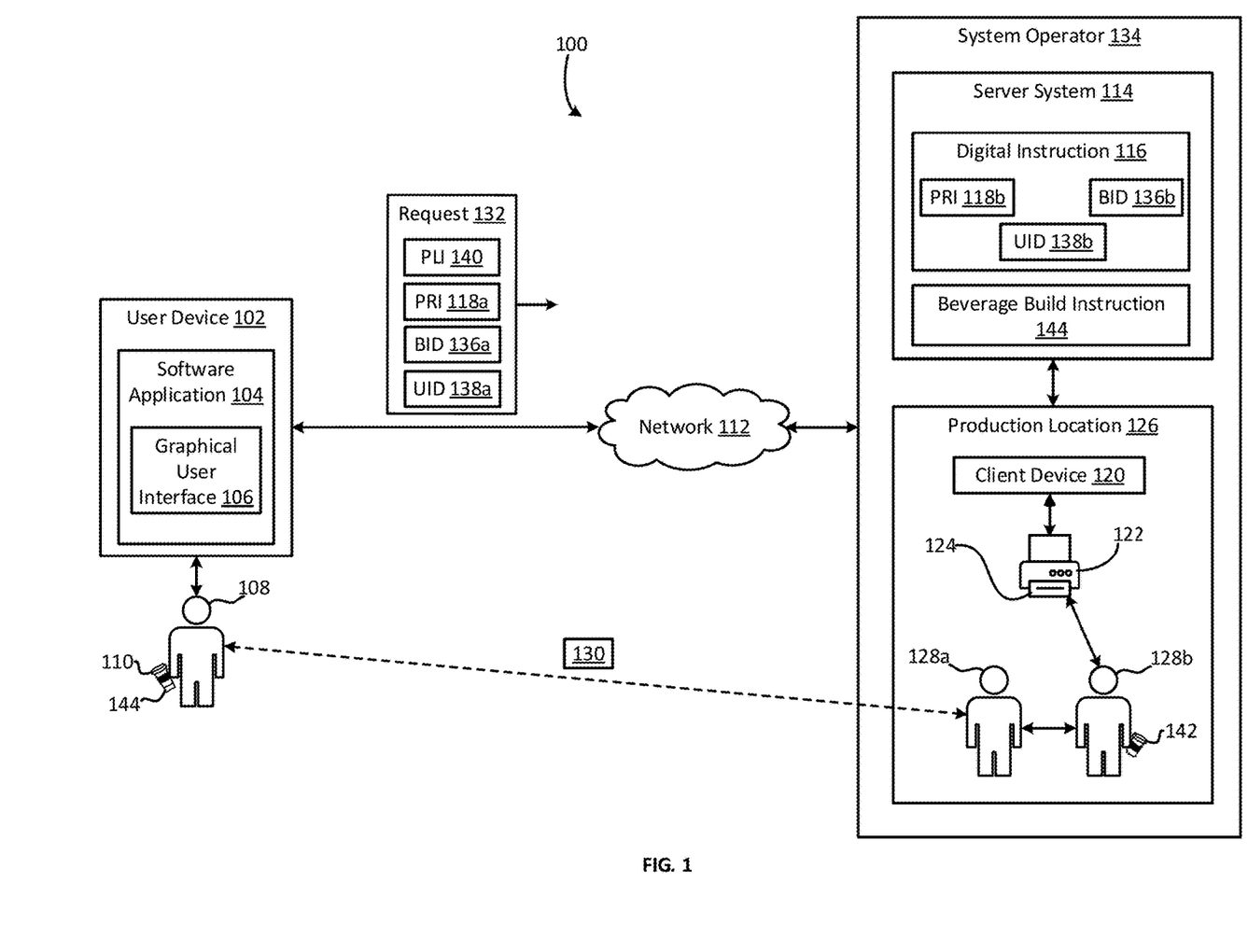
FIG. 1 is a block diagram of an example of a software application and computer system for using personal receptacles according to some aspects of the present disclosure.

FIG. 1 is a block diagram of an example of a system 100 that includes a software application and computer system for using personal receptacles according to some aspects of the present disclosure. The system 100 includes a user device 102, such as a laptop computer, desktop computer, tablet, kiosk, mobile phone, or a wearable device such as a smart watch. The user device 102 can execute a software application 104 usable by a requestor 108 to request a beverage from a production location 126, such as a store.

The software application 104 can be any suitable software program executable on a computing device. Examples of the software application 104 can include a mobile application (e.g., a native application for Android® or iOS®), a web application, or a website browser. In some examples, the software application 104 may be provided by the same system operator 134 that owns or operates the production location 126. For example, the software application 104 may be the Starbucks® mobile application and the production location 126 may be a Starbucks® location. In other examples, the software application 104 may be provided by a third party that does not own or operate the production location 126. For example, the software application 104 may be a mobile application provided by a third party, such as Uber Eats®, through which the requestor 108 can request a beverage from an unaffiliated production location 126 such as Starbucks®.

The software application 104 can include a graphical user interface 106 through which the requestor 108 can select a beverage from among a group of beverage choices. For example, the graphical user interface 106 can include user interface elements (e.g., buttons, menu options, radio buttons, checkboxes, etc.) associated with the beverage choices, where the user interface elements are selectable by the requestor 108 to request a certain beverage. Because there may be multiple production locations from which the requestor 108 can obtain the beverage, the software application 104 can also include user interface elements through which the requestor 108 can select a particular production location 126 at which to receive the selected beverage. For example, the graphical user interface 106 can include user interface elements associated with multiple production locations, where the user interface elements are selectable by the requestor 108 to select a particular production location 126 at which to obtain the beverage.

In some examples, the software application 104 can also include a user interface element that is selectable to request that the beverage be provided to the requestor 108 in their personal receptacle 110. For example, the graphical user interface 106 can include a checkbox or button that can be selected by the requestor 108 to indicate that they would like to receive the selected beverage in their personal receptacle 110. This user interface element can be referred to herein as the personal receptacle option. The personal receptacle option can be positioned in any suitable location within the graphical user interface 106, for example on a checkout page. In some examples, the requestor 108 may also be presented with an option in the graphical user interface 106 to apply the personal receptacle option as a default setting. If the requestor 108 chooses to save the personal receptacle option as a default setting, then their user profile can be updated to apply the personal receptacle option by default for each beverage request. For example, the software application 104 can automatically apply the personal receptacle option to each subsequent beverage request, until this setting is disengaged. With this setting applied, the requestor 108 does not need to manually select the personal receptacle option each time they request a beverage, which can streamline the process for the requestor 108.

After making any appropriate selections in the graphical user interface 106, the requestor 108 can operate the software application 104 to submit the request 132. The request 132 may include a beverage identifier (BID) 136a that identifies the selected beverage, a user identifier (UID) 138a that identifies the requestor 108, a production location identifier (PLI) 140 that identifies the selected production location 126, or any combination of these. An example of the beverage identifier 136a can include a unique beverage code for the selected beverage, an example of the user identifier 138a can be the requestor's name, and an example of the production location identifier 140 can be a unique store code or address for the selected production location 126. Based on the requestor 108 selecting the personal receptacle option, the software application 104 can also include a personal receptacle indicator (PRI) 118a in the request 132. The personal receptacle indicator 118a can indicate that the personal receptacle option was selected. Examples of the personal receptacle indicator 118a may include a unique code, word, or acronym indicating that the personal receptacle option was selected.

The request 132 can be received by a server system 114 via one or more networks, such as the Internet. The server system 114 can be associated with the production location 126. For example, the server system 114 and the production location 126 may both be owned or operated by the same system operator 134, which may be a corporation or other entity that is different from the requestor 108. The server system 114 can include one or more computing devices, such as servers, desktop computers, laptop computers, terminals, kiosks, or any combination of these. In some examples, the server system 114 may include one or more software services executing in a distributed computing environment, such as a cloud computing environment or computing cluster.

In response to receiving the request 132, the server system 114 can generate a digital instruction 116 to create the selected beverage. A digital instruction 116 can be an instruction stored in a digital medium. The digital instruction 116 may include a beverage identifier 136b and a user identifier 138b. The beverage identifier 136b and the user identifier 138b in the digital instruction 116 may be the same as or different from those provided in the request 132. For example, the beverage identifier 136a provided in the request 132 may be a unique code assigned to the beverage, whereas the beverage identifier 136b included in the digital instruction 116 may be a predesignated name of the beverage. As another example, the user identifier 138a provided in the request 132 may be a unique account number associated with an account of the requestor 108, whereas the user identifier 138b in the digital instruction 116 may be a name associated with the account. The identifiers incorporated into the digital instruction 116 may be designed to be more readily understandable by one or more entities 128a-b (e.g., human personnel) at the production location 126, whereas the identifiers included in the request 132 may be designed to be more readily interpretable by the server system 114. The server system 114 can determine the beverage identifier 136b for the digital instruction 116 based on the beverage identifier 136a in the request 132. The server system 114 can also determine the user identifier 138b for the digital instruction 116 based on the user identifier 138a in the request 132.

In some examples, the server system 114 can also include a personal receptacle indicator 118b in the digital instruction 116. This can indicate that the personal receptacle option was selected. The personal receptacle indicator 118b in the digital instruction 116 may be the same as or different from the one in the request 132. For example, the a personal receptacle indicator 118a in the request 132 may be a unique code configured to indicate to the server system 114 that the personal receptacle option was selected, whereas the a personal receptacle indicator 118b in the digital instruction 116 may include image data or text data that is different from the unique code. Examples of the image data can include icons or pictures. Examples of the text data can include an acronym, such as "PR" for "personal receptacle," or a word. The personal receptacle indicator 118b in the digital instruction 116 may be designed to be more readily understandable by one or more entities 128a-b at the production location 126, whereas the personal receptacle indicator 118a in the request 132 may be designed to be more readily interpretable by the server system 114.

In some examples, the server system 114 may generate the personal receptacle indicator 118b for the digital instruction 116 by modifying a user identifier associated with the requestor 108. For example, the server system 114 may modify the user's name from "John Smith" to "PR-John Smith" to notify the entities 128a-b that the personal receptacle option was selected. In this example, the modified name would serve as both the user identifier 138b and the personal receptacle indicator 118b in the digital instruction 116.

After generating the digital instruction 116, the server system 114 can output a beverage build instruction 144 corresponding to the digital instruction 116. The beverage build instruction 144 can be an instruction configured to facilitate the creation of the requested beverage. The beverage build instruction 144 can be generated based on the digital instruction 116 and can include some or all of the content in the digital instruction 116, such as the beverage identifier 136b, the user identifier 138b, and the personal receptacle indicator 118b. Examples of the beverage build instruction 144 can include a text message, e-mail message, an output on a display device, an auditory command, or any combination of these. For instance, the server system 114 can output a beverage build instruction 144 that is a text message or an e-mail to a user device of an entity 128b at the production location 126 to initiate the process of creating the requested beverage. As another example, the server system 114 can output a beverage build instruction 144 that is an auditory output describing details of the beverage request by interacting with an audio system at the production location 126 to generate the auditory output. Alternatively, the server system 114 can output a beverage build instruction 144 that is an auditory output by transmitting a command to a client device 120 positioned at the production location 126. Examples of the client device 120 can include a desktop computer, laptop computer, or tablet. The client device 120 can respond to the command by interacting with the audio system to generate the audio output. As still another example, the server system 114 can output the beverage build instruction 144 by transmit a command to the client device 120 for causing the client device 120 to display the beverage build instruction 144 on a display screen for viewing by the entity 128b.

As noted above, the server system 114 may transmit the beverage build instruction 144 to a client device 120 at the production location 126. Because different production locations may be associated with different client devices, the server system 114 may use a predefined mapping to correlate the production location identifier 140 in the request 132 to the correct client device 120. After identifying the correct client device 120, the server system 114 can transmit the beverage build instruction 144 to the client device 120 via one or more networks 112. The client device 120 can receive the beverage build instruction 144 and perform one or more computing operations based on the beverage build instruction 144.

In some examples, the beverage build instruction 144 can be a physical instruction 124. The server system 114 can output the beverage build instruction 144 by causing a printer 122 to print the physical instruction 124. For example, the server system 114 can transmit a command to the client device 120 for causing the client device 120 to operate a printer 122 to print the physical instruction 124. The physical instruction 124 may be a physical copy of the beverage build instruction 144. A physical instruction can be an instruction printed on a physical medium, such as paper. The physical instruction 124 can include some or all of the content in the digital instruction 116, such as the beverage identifier 136b, the user identifier 138b, and the personal receptacle indicator 118b.

The beverage build instruction 144 may be in the same format as the digital instruction 116 or in a different format than the digital instruction 116. For example, the client device 120 can transform the digital instruction 116 from a first format into a second format, where the second format may be more easily understood by the entities 128a-b. Transforming the digital instruction 116 into the second format may involve spatially reorganizing its content, adding additional content (e.g., graphics or textual content), or removing existing content. The client device 120 can then output the beverage build instruction 144, for example by operating the printer 122 to print the beverage build instruction 144 in the second format and thereby create the physical instruction 124.

At the production location 126, an entity 128b can receive the beverage build instruction 144 and begin to create the requested beverage. The entity 128b can begin to create the requested beverage, and may finish creating the requested beverage, before the requestor 108 arrives at the production location 126. The entity 128b can create the requested beverage in a reusable container 142, which may be reused to create multiple beverages for multiple requestors. When the requestor 108 arrives at the production location 126, the requestor 108 can provide their personal receptacle 110 to the entities 128a-b, which can transfer the beverage from the reusable container 142 into the personal receptacle 110 of the requestor 108. Through this process, the beverage may be substantially completed prior to the requestor's arrival at the production location 108 and quickly provided to the requestor 108.

In some examples, the entities 128a-b and the requestor 108 can transfer the personal receptacle 110 among one another using a vessel 130, such as a plastic container or cardboard box. For example, after arriving at the production location 126, the requestor 108 can place the personal receptacle 110 into the vessel 130. The entities 128a can then transfer the beverage from the reusable container 142 into the user's personal receptacle 110, while the personal receptacle 110 remains in the vessel 130. The entities 128a-b can then provide the vessel 130, still containing the personal receptacle 110 with the beverage, back to the requestor 108. Using the vessel 130 in this way can help prevent the entities 128a-b from physically contacting the personal receptacle 110, which can reduce the spread of germs. The vessel 130 can also help prevent contamination to and from various surfaces of the production location 126.

In some examples, the requestor 108 can link the personal receptacle 110 to their user account or to the request 132. For example, the requestor 108 can input a personal receptacle identifier (PRI) via the graphical user interface 106 and select an option to link the personal receptacle 110 to their user account. The PRI can be a unique identifier associated with the personal receptacle 110. Examples of the receptacle identifier can include a serial number, barcode, or media access control (MAC) address. Providing the PRI may help with tracking the personal receptacle 110 at the production location 126 to ensure that the correct beverage is poured into the correct requestor's personal receptacle 110. For example, the production location 126 may have received dozens of beverage requests from dozens of requestors. To help distinguish them from one another, PRIs may be included in the requests and printed on the physical instructions to assist the entities 128a-b in pairing the correct beverage with the personal receptacles of the requestors.

In some examples, the server system 114 can receive location data from the personal receptacle 110. For example, the personal receptacle 110 can include circuitry 144 including a location sensor, such as a global positioning system (GPS) unit. The location sensor can be configured to generate location data indicating the physical location of the personal receptacle 110. The circuitry 144 can also include a transceiver unit for transmitting the location data generated by the location sensor. The transceiver unit may be configured to communicate via a wireless interface, such as Bluetooth, Wifi (e.g., 802.11g), or a cellular transmission protocol. Based on the requestor 108 requesting a beverage via the software application 104, the server system 114 can begin to receive the location data indicating the location of the physical location of the personal receptacle 110. For example, the personal receptacle 110 can connect to the user device 102 via Bluetooth or another communications protocol. The personal receptacle 110 can then relay its location data to the server system 114 via the user device 102. Alternatively, the personal receptacle 110 may more directly transmit its location data to the server system 114 via a cellular network or another wireless connection, without going through the user device 102. As the server system 114 receives the location data, the server system 114 can link the location data to the requestor's account or the request 132 via the PRI described above.

In some examples, the server system 114 can use the location data to track the physical location of the personal receptacle 110 for facilitating beverage-making operations. For example, the server system 114 may determine the physical proximity of the personal receptacle 110 to the production location 126 and notify the entities 128a-b of the same, so that the entities 128a-b can prioritize beverage requests based on the distance of the requestors from the production location 126. Additionally or alternatively, the server system 114 can automatically prioritize requests from multiple requestors based on the distance of the requestors to the production location 126. As their distances change over time, the server system 114 may dynamically re-prioritize the requests as needed. This may help improve efficiency at the production location 126. Using the location of the personal receptacle 110 as a tracking mechanism may be more accurate than using the location of the user device 102. This is because the requestor 108 may intentionally or accidentally leave the user device 102 at home or in another location when picking up the requested beverage, but the requestor 108 is less likely to forget the personal receptacle 110 in which they intend to receive the requested beverage.

In some examples, the requestor 108 can also input or import other information about their personal receptacle 110, such as its size, into the software application 104. For example, the requestor 108 can input or import this personal receptacle information via the graphical user interface 106 and save it for repeat use. The software application 104 can incorporate the personal receptacle information in the request 132 transmitted to the server system 114. In turn, the server system 114 can incorporate the personal receptacle information into the digital instruction 116 and the beverage build instruction 144 for use by the entities 128a-b when making a beverage. For example, the entities 128a-b can use size information printed on the physical instruction 124 to make a requested beverage of the correct size. Saving the personal receptacle information may facilitate the checkout process so that the requestor 108 need not manually select the desired beverage size to match their personal receptacle 110 each time they submit a request.

In some examples, the server system 114 can track and manage inventory of single-use containers (e.g., single-use cups) at the production location 126 based on received beverage requests. For example, the server system 114 may be configured to subtract one single-use container from the total count by default each time a request 132 is received, since each beverage will generally require a single-use container. But the server system 114 may not perform this subtraction if the request 132 includes the personal receptacle indicator 118a, because the requestor 108 will use their own receptacle. This may help with more accurately keeping track of the total available number of single-use containers. In some examples, the server system 114 can automatically request additional single-use containers when it determines that the total number of available single-use containers is low (e.g., below a threshold amount).

Although various examples are described herein with reference to beverages, similar concepts can also be applied to other consumables such as food items. Thus, the examples described herein are not intended to be limited to beverages. For example, a requestor 108 may interact with the graphical user interface 106 of the software application 104 to request a breakfast item, a lunch item, or a dinner item. The requestor 108 may also select a personal receptacle option in the graphical user interface 106 to receive the food in their personal receptacle 110, which may be a plate or take-out carrier in this context. The food can then be prepared in a reusable container 142 and transferred to the personal receptacle 110 of the requestor 108 in the manner described above.

Figure 2:
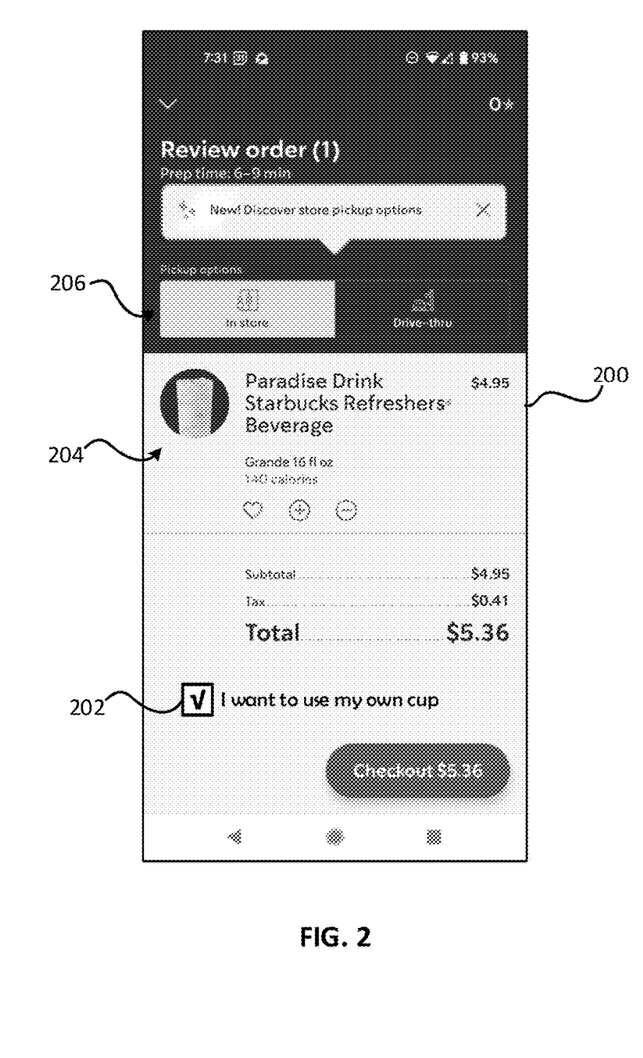
FIG. 2 is an example of a graphical user interface for requesting to use a personal receptacle according to some aspects of the present disclosure.

FIG. 2 is an example of the graphical user interface 106 for requesting to use a personal receptacle 110 according to some aspects of the present disclosure. As shown, the page 200 can include beverage information 204 indicating a beverage selected by a user, such as requestor 108 of FIG. 1. The beverage information 204 can include the name of the beverage, a size of the beverage (e.g., 16 fl oz) to be made, a calorie count, and other details associated with the beverage. The page 200 can also include pickup options 206 for receiving the selected beverage at different areas of the production location. For example, the page 200 can include a first option for receiving the beverage inside a building and a second option for receiving the beverage at a drive-thru. The user can select among the pickup options to indicate where, at a selected production location, the user would like to receive the beverage. The page 200 can further include a personal receptacle option 202 that is selectable by the user to receive the beverage in their personal receptacle. In this example the personal receptacle option 202 is a checkbox that is spatially positioned toward the bottom of the page 200, but in other examples the personal receptacle option 202 may be another type of graphical interface element that may be spatially positioned elsewhere in the page 200. The personal receptacle option 202 may be positioned in any suitable location of the graphical user interface 106.

In some examples, the graphical user interface 106 may include personalized content for the user. The personalized content can be generated based on the user's personal information, such as their name, address, and birthday. For example, the user may input their personal information when they sign up for an account and receive personalized greetings and birthday messages. This may help the experience feel more personalized to the user.

In some examples, the server system can keep track of how many times the user has chosen to use their personal receptacle and provide corresponding feedback via the graphical user interface 106. For example, the graphical user interface can be configured to notify the user of how many single-use containers they have saved by using their personal receptacle, how many trees they have saved by using their personal receptacle, and/or how many rewards they have earned for using their personal receptacle. This type of feedback may help encourage users to continue using their personal receptacle for future beverage requests.

Figure 3:
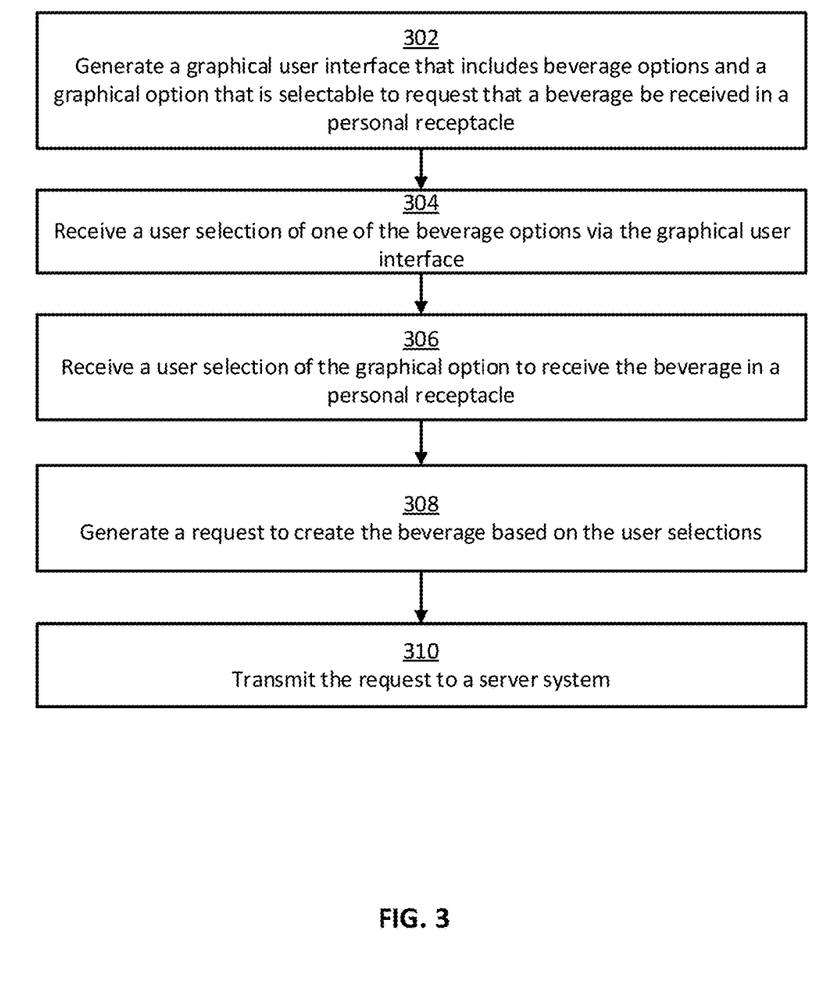
FIG. 3 is a flowchart of an example of a process for requesting to use a personal receptacle implemented by a software application according to some aspects of the present disclosure.

FIG. 3 is a flowchart of an example of a process for requesting to use a personal receptacle 110 implemented by a software application 104 according to some aspects of the present disclosure. Other examples may involve more operations, fewer operations, different operations, or a different order of operations than is shown in FIG. 3. The process of FIG. 3 is described below with reference to the components of FIG. 1 described above.

In block 302, the software application 104 generates a graphical user interface 106 that includes beverage options. The graphical user interface 106 also includes a graphical option that is selectable to request that a beverage be provided to the requestor 108 in their personal receptacle 110.

In some examples, the software application 104 can execute on a user device 102 of the requestor 108 of the beverage. In this scenario, the user device 102 may be remote from the production location 126 and owned by the requestor 108. In other examples, the software application 104 can execute on a computing device that is physically located at the production location 126. For example, the production location 126 can include a kiosk or another computing device executing the software application 104. The computing device may be owned by an entity other than the requestor 108, such as the system operator 134. Visitors of the production location 126, or an entity 128b working at the production location 126, can input beverage requests to the computing device via the graphical user interface 106. This is described in greater detail later on with respect to FIG. 6.

In block 304, the software application 104 receives a user selection of one of the beverage options via the graphical user interface 106. If the software application 104 is executing on the user device 102, then the user inputting the selection may be an owner of the user device 102. If the software application 104 is executing on a computing device physically located at the production location 126, then user inputting the selection may be a visitor of the production location 126 or an entity 128b working at the production location 126.

In block 306, the software application 104 receives a user selection of the graphical option in the graphical user interface 106 to receive the beverage in the personal receptacle 110. For example, the user may select a checkbox in the graphical user interface 106 to receive the beverage in the personal receptacle 110.

In block 310, the software application 104 generates a request to create the beverage based on the user's selections. The request can include a beverage identifier and a personal receptacle identifier. An example of the request can be the request 132 of FIG. 1, which may include the beverage identifier 136a and the personal receptacle indicator 118a.

In block 312, the software application 104 transmits the request to a server system 114. The request can be transmitted to the server system 114 via one or more networks. The server system 114 may receive the request and responsively generate a digital instruction 116 based on the request. Additionally or alternatively, the server system 114 may store data about the request, for example to track beverage requests across multiple users.

Figure 4:
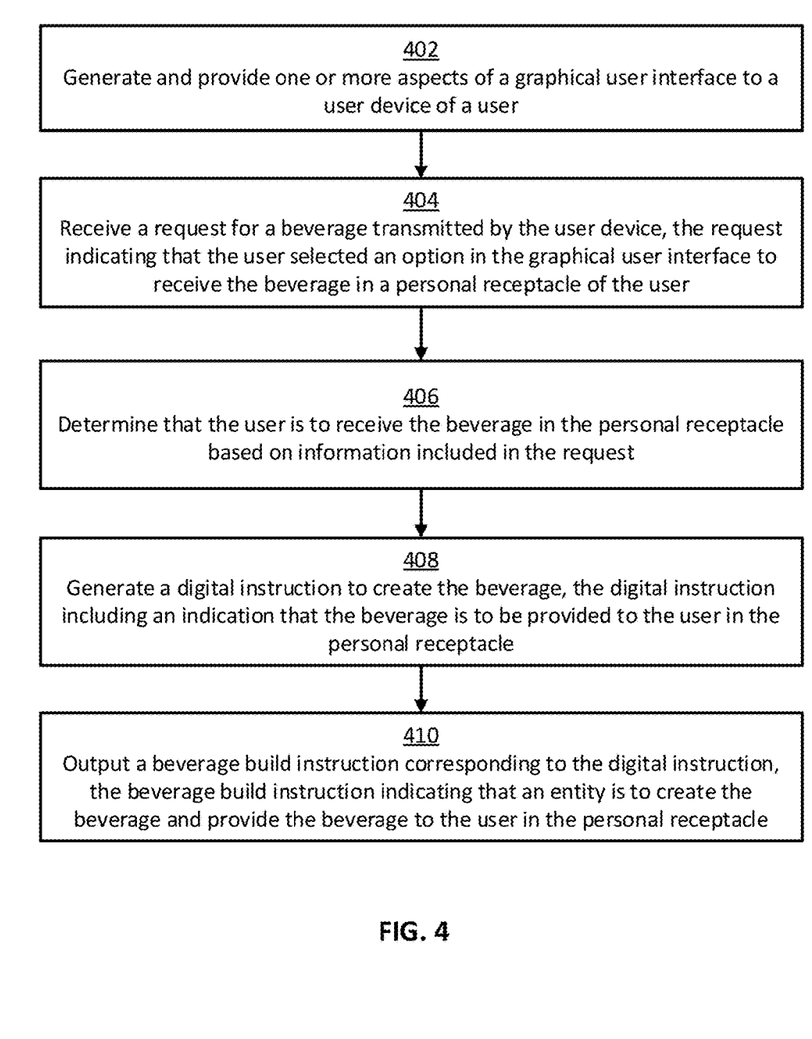
FIG. 4 is a flowchart of an example of a process implemented by a server system for enabling usage of a personal receptacle according to some aspects of the present disclosure.

FIG. 4 is a flowchart of an example of a process implemented by a server system 114 for enabling usage of a personal receptacle 110 according to some aspects of the present disclosure. Other examples may involve more operations, fewer operations, different operations, or a different order of operations than is shown in FIG. 4. The process of FIG. 4 is described below with reference to the components of FIG. 1 described above.

In block 402, the server system 114 generates and provides one or more aspects of a graphical user interface 106 to a user device 102 of a requestor 108. For example, the server system 114 can determine which beverage options are available at a production location 126 and provide a list of available beverage options to the user device 102. The production location may have been previously selected by the requestor 108 via the graphical user interface 106. In response to receiving the list of available beverage options, the user device 102 can populate the graphical user interface 106 with the list. As another example, the server system 114 can determine a score (e.g., a number of points) associated with the requestor 108 and provide the score to the user device 102, which can incorporate the score into the graphical user interface 106. As still another example, the server system 114 can generate historical information associated with the requestor 108, for example about the requestor's prior beverage requests. The server system 114 can then provide the historical information to the user device 102, which can incorporate the historical information into the graphical user interface 106.

In some examples, the graphical user interface 106 may be part of a native application executable on the user device 102. In other examples, the graphical user interface 106 may be part of a webpage. A requestor 108 can access the graphical user interface 106 by visiting the webpage using a website browser on the user device 102. In some such examples, the server system 114 can generate the webpage code for the webpage and provide it to the website browser for rendering. Examples of the webpage code may include hypertext transfer markup language (HTML) code, JavaScript code, cascading stylesheet (CSS) code, jQuery code, or any combination of these.

In block 404, the server system 114 receives a request 132 for a beverage transmitted by the user device 102. The server system 114 can receive the request 132 via one or more networks 112. The request 132 can indicate that the requestor 108 selected a graphical option (e.g., the personal receptacle option) in the graphical user interface 106 to receive the beverage in a personal receptacle 110. For example, the request 132 can include a user identifier 138a associated with the requestor 108, a beverage identifier 136a associated with the selected beverage, a production location identifier 140 associated with the selected production location 126, and a personal receptacle indicator 118a.

In block 406, the server system 114 determines that the requestor 108 is to receive the beverage in the personal receptacle 110 based on information included in the request 132. For example, the server system 114 can extract data from the request 132 to determine whether the data includes the personal receptacle indicator 118a. In some examples, the personal receptacle indicator 118a may be a flag that can be set to a value, such as 1, when the user has selected the personal receptacle option.

In block 408, the server system 114 generates a digital instruction 116 to create the beverage. In some examples, the digital instruction 116 can prevent the beverage from being dispensed in a single-use container. For example, the digital instruction 116 can include an indication, such as personal receptacle indicator 118b, that the beverage is to be provided to the requestor 108 in the personal receptacle 110. In other examples, the digital instruction 116 can cause the entity 128b to prepare the beverage in a single-use container. Thus, the digital instruction 116 can be a type of command issued by the server system 114 to control the dispensing of the beverage into the correct type of container.

In some examples, the digital instruction 116 can also include other information, such as a user identifier 138b associated with the requestor 108 and a beverage identifier 136b associated with the selected beverage. Additionally, the digital instruction 116 can include preparation directions. The preparation directions may indicate how to make the beverage, for example the beverage's size, ingredients, and proportions. The preparation directions for the selected beverage may be retrieved from a database by the server system 114. In some examples, the digital instruction 116 may further specify a pickup area at the selected production location 126 at which the requestor 108 is to receive the beverage. For example, the requestor 108 may opt to receive the beverage at a drive-thru window.

In block 410, the server system 114 outputs a beverage build instruction 144 corresponding to the digital instruction 116. Outputting the beverage build instruction 114 may involve interacting with one or more other computing devices, such as a client device 120 at the production location 126. The beverage build instruction 144 may include a digital message (e.g., an e-mail or text message) or a physical message configured to initiate the beverage build process. The server system 114 can generate the beverage build instruction 144 based on the digital instruction 116.

In some examples, the server system 114 can output the beverage build instruction 144 by causing a printer 122 to print a physical instruction 124, where the physical instruction 124 may constitute the beverage build instruction 144 in this context. The physical instruction 124 may prevent the beverage from being dispensed in a single-use container. For example, the physical instruction 124 can trigger an entity 128b at the production location 126 to create the beverage and provide the beverage to the requestor 108 in the personal receptacle 110. In other examples, the physical instruction 124 can cause the entity 128b to prepare the beverage in a single-use container. Thus, the physical instruction 124 can be a type of command generated based on the digital instruction 116 of the server system 114.

In some examples, the server system 114 can cause the printer 122 to print the physical instruction 124 by transmitting the digital instruction 116 to the printer 122. Alternatively, the server system 114 can cause the printer 122 to print the physical instruction 124 by transmitting the digital instruction 116 to a client device 120, which in turn can operate the printer 122 to print the physical instruction 124. The client device 120 may transform the digital instruction 116 from a first format to a second format prior to printing it, in some examples. Automatically controlling the printer to print the physical instruction 124 based on the digital instruction 116 can help ensure that beverage requests are not missed by the entities 128a-b at the production location.

Figure 5:
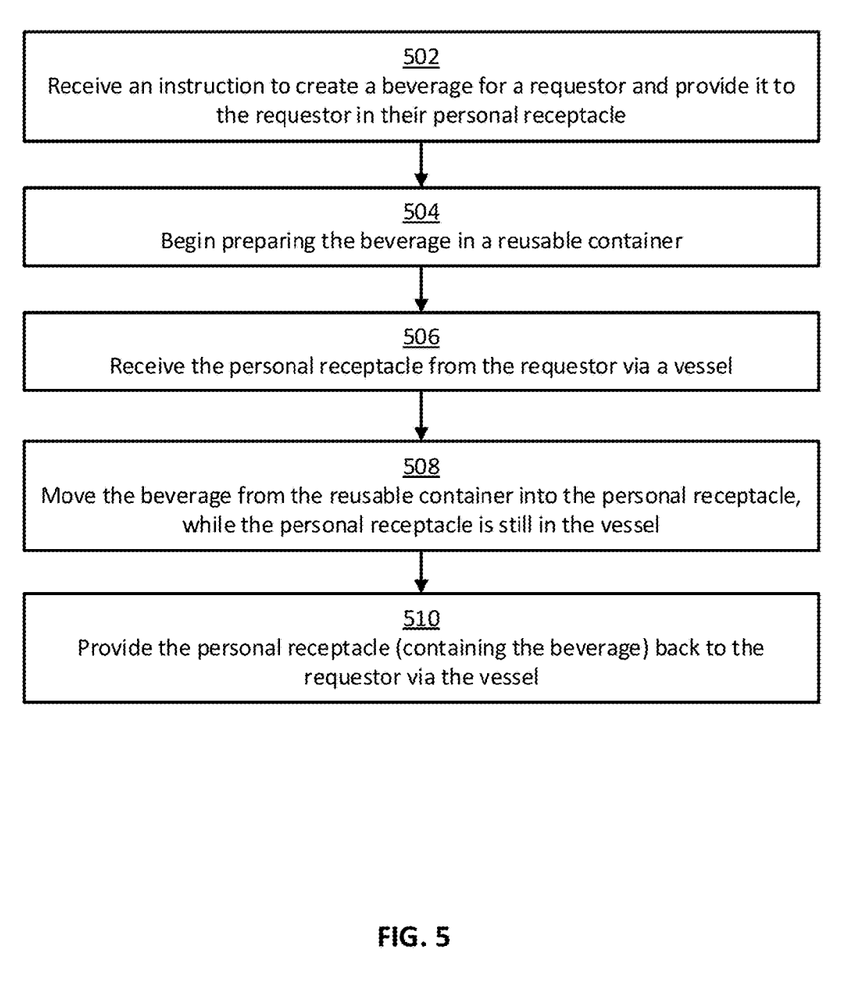
FIG. 5 is a flowchart of an example of a process for providing a beverage in a personal receptacle according to some aspects of the present disclosure.

FIG. 5 is a flowchart of an example of a process for providing a beverage in a personal receptacle 110 according to some aspects of the present disclosure. Other examples may involve more operations, fewer operations, different operations, or a different order of operations than is shown in FIG. 5. The process of FIG. 5 is described below with reference to the components of FIG. 1 described above.

In block 502, an entity 128b receives an instruction to create a beverage for a requestor 108 and provide the beverage to the requestor 108 in their personal receptacle 110. An example of the instruction can be the physical instruction 124, which can be printed and obtained by the entity 128b. Another example of the instruction can be a version of the beverage build instruction 144 output on a display device for viewing by the entity 128b. Yet another example of the instruction can be a verbal instruction, which may be provided directly by the requestor 108 (e.g., using an intercom system at a drive-thru window) or by another entity 128a on behalf of the requestor.

In block 504, the entity 128b begins preparing the beverage in a reusable container 142. An example of the reusable container 142 may be a reusable cup that is cleaned between each use. To prepare the beverage, the entity 128b may physically mix different ingredients together. The entity 128b may also use one or more physical machines to make the beverage. Examples of the machines can include mixers, fluid dispensers, frothers, microwaves, heaters, coffee makers, and stoves.

In block 506, the entity 128b receives the personal receptacle 110 from (e.g., directly or indirectly from) the requestor 108. In some examples, the entity 128b can receive the personal receptacle 110 via a vessel 130. The vessel 130 can be a movable, physical holder for transferring the personal receptacle 110 between parties.

In block 508, the entity 128b moves the beverage from the reusable container 142 into the personal receptacle 110 from the requestor 108. This can occur while the personal receptacle 110 is still within the vessel 130, for example such that the personal receptacle 110 is not removed from the vessel 130 or contacted by the entity 128b during the process.

In block 510, the entity 128b provides the personal receptacle 110 (containing the beverage) back to the requestor 108. In some examples, the entity 128b can return the personal receptacle 110 to the requestor 108 in the vessel 130. For example, the entity 128b can hold the vessel 130 out to the requestor so that the requestor 108 can reach into the vessel 130 and retrieve the personal receptacle 110 therefrom.

Figure 6:
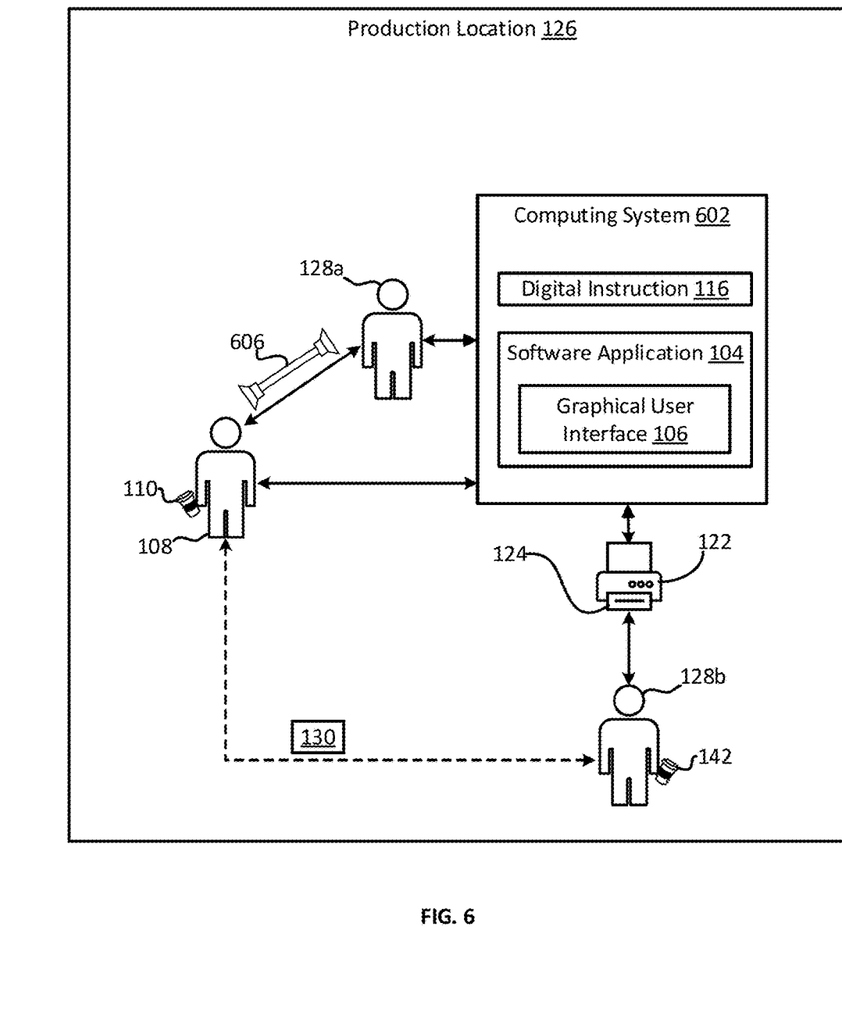
FIG. 6 is a block diagram of another example of a system for enabling usage of a personal receptacle according to some aspects of the present disclosure.

FIG. 6 is a block diagram of another example of a system for enabling usage of a personal receptacle 110 according to some aspects of the present disclosure. The system includes a computing system 602 physically positioned at a production location 126. The computing system 602 can include one computing device or multiple computing devices. For example, the computing system 602 can include a POS terminal, a kiosk, a tablet, a laptop computer, a desktop computer, a server, or any combination of these in communication with one another. In some examples, the computing system 602 may include a computing device that is affixed to the production location 126 so that it is relatively unmovable.

The computing system 602 can execute a software application 104 to provide a graphical user interface 106. The graphical user interface 106 can allow a user to select a beverage from among a group of beverage choices. The graphical user interface 106 can also allow the user to indicate that the beverage is to be provided to a requestor 108 of the beverage in their personal receptacle 110.

In some examples, the user of the graphical user interface 106 may be the requestor 108 of the beverage. For example, the requestor 108 can directly interact with the graphical user interface 106 to input their selections. Alternatively, the user of the graphical user interface 106 may be an entity 128a that is different from the requestor 108. The entity 128a may work at the production location 126. The entity 128a can interact with the requestor 108 and input the requestor's selections on their behalf. For example, the entity 128a can verbally receive the requestor's selections at an ordering counter of the production location 126. The entity 128a can then input the requestor's selections on their behalf. As another example, the entity 128a can verbally receive the requestor's selections via an intercom system 606 positioned at a drive-thru of the production location 126. The intercom system 606 can include microphones and speakers for allowing the requestor 108 to communicate with the entity 128a. The entity 128a can then input the requestor's selections on their behalf.

In some examples, the computing system 602 can be communicatively coupled to the intercom system 606 for performing automatic audio processing. For example, the requestor 108 can verbally input their selections into a microphone of the intercom system 606. The microphone can generate an audio signal based on the verbal inputs and provide the audio signal to the computing system 602. The computing system 602 may then automatically process the audio signal using one or more audio processing technologies, such as neural networks or algorithms, to determine the requestor's selections.

Regardless of how the requestor's selections are input, the computing system 602 can receive the requestor's selections and generate a corresponding digital instruction 116. The digital instruction 116 can be a digital record associated with the beverage request. The digital instruction 116 may include any of the features described above with respect to digital instructions. For example, the digital instruction 116 may include a command configured to prevent dispensing of the beverage into a single-use container. After generating the digital instruction 116, the computing system 602 can operate a printer 122 to print a physical instruction 124 associated with the digital instruction 116. In some examples, the computing system 602 may translate the digital instruction 116 from a first format to a second format prior to printing the physical instruction 124, as described above with respect to FIG. 1. The computing system 602 may additionally or alternatively output the digital instruction 116 on a display device for viewing by an entity 128b at the production location 126. In some examples, the computing system 602 may only output the digital instruction 116 on the display device, and may not print the corresponding physical instruction 124, to conserve paper and thereby further reduce environmental impacts.

The entity 128b can receive the instruction (e.g., the printed physical instruction 124 or the displayed digital instruction 116) and begin to create the requested beverage. The entity 128b can begin to create the requested beverage, and may finish creating the requested beverage, before the requestor 108 arrives at a pickup location such as a drive-thru window or pickup counter. The entity 128b can create the requested beverage in a reusable container 142, which may be reused to create multiple beverages for multiple requestors. After arriving at the pickup location, the requestor 108 can provide their personal receptacle 110 to one of the entities 128a-b, which can transfer the beverage from the reusable container 142 into the personal receptacle 110 of the requestor 108. Through this process, the beverage may be at least substantially completed prior to the requestor's arrival at the pickup location and quickly provided to the requestor 108.

In some examples, the entities 128a-b and the requestor 108 can transfer the personal receptacle 110 among one another using a vessel 130, as described above. For example, the requestor 108 can place the personal receptacle 110 into the vessel 130, at which point the entities 128a can transfer the beverage from the reusable container 142 into the requestor's personal receptacle 110. This transfer may occur while the personal receptacle 110 remains in the vessel 130. The entities 128a-b can then provide the personal receptacle 110 with the beverage back to the requestor 108 via the vessel 130.

In some examples, the entities 128a-b can use the software application 104 to track the physical location of the personal receptacle 110 or the requested beverage while the beverage is being made and provided to the requestor 108. For example, the entities 128a-b can input the current location of the requested beverage in the reusable container 142 as the beverage makes its way through various stations in the production location 126. This may be achieved, for example, by scanning a barcode on the reusable container 142 using a barcode scanning device or otherwise inputting this information at each station. Each station may be dedicated to a different part of the beverage-making process. The entities 128a-b can likewise input the current location of the personal receptacle 110 as it makes its way through various stations in the production location 126 to track its location. For example, the entities 128a-b can scan a barcode on the personal receptacle 110 upon receiving it, through each station at the production location 126, and upon returning the personal receptacle 110 back to the requestor 108. The entities 128a-b can use this tracking information to help ensure that beverages and personal receptacles do not get lost, and to help pair the correct beverage with the correct personal receptacle 110.

Figure 7:
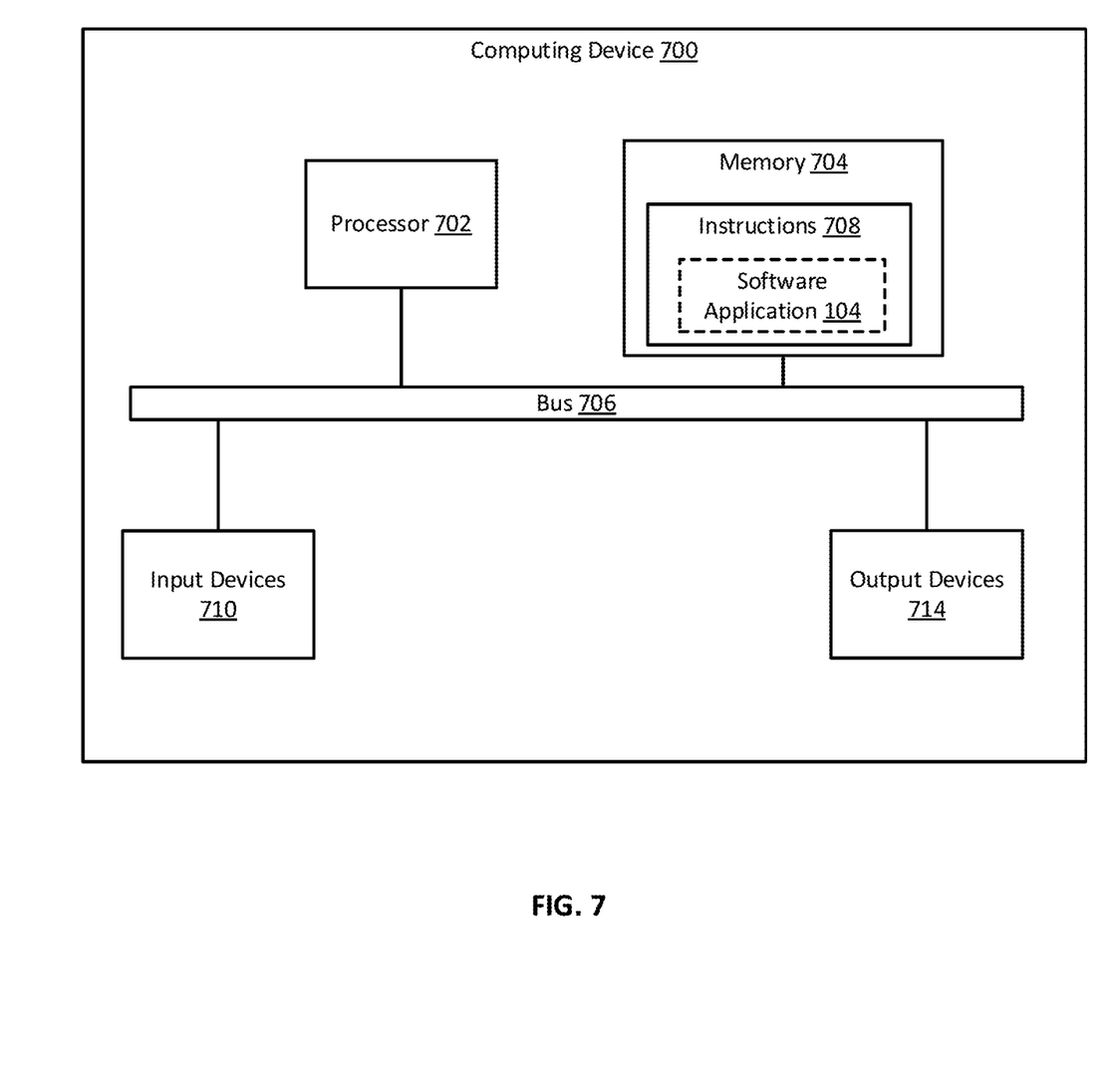
FIG. 7 is a block diagram of an example of a computing device usable to implement some aspects of the present disclosure.

FIG. 7 is a block diagram of an example of a computing device 700 usable to implement some aspects of the present disclosure. In some examples, the computing device 700 can correspond to the user device 102, server system 114, the client device 120, or computing system 602 described above.

The computing device 700 includes a processor 702 communicatively coupled to a memory 704 by a bus 706. The processor 702 can include one processor or multiple processors. Examples of the processor 702 can include a Field-Programmable Gate Array (FPGA), an application-specific integrated circuit (ASIC), or a microprocessor. The processor 702 can execute instructions 708 stored in the memory 704 to perform operations. The instructions 708 may include processor-specific instructions generated by a compiler or an interpreter from code written in any suitable computer-programming language, such as C, C++, C#, Java, or Python.

The memory 704 can include one memory device or multiple memory devices. The memory 704 can be volatile or non-volatile (e.g., it can retain stored information when powered off). Examples of the memory 704 include electrically erasable and programmable read-only memory (EEPROM), flash memory, or cache memory. At least some of the memory 704 includes a non-transitory computer-readable medium from which the processor 702 can read instructions 708. A computer-readable medium can include electronic, optical, magnetic, or other storage devices capable of providing the processor 702 with the instructions 708 or other program code. Examples of a computer-readable mediums include magnetic disks, memory chips, ROM, random-access memory (RAM), an ASIC, a configured processor, or optical storage.

In some examples, the instructions 708 can include the software application 104 of FIG. 1. The software application 104 may be executable by the processor 702 for causing the processor 702 to perform any amount and combination of the functionality described herein. The software application 104 may also be executable by the processor 702 to perform more functionality, less functionality, or different functionality than is described herein.

The computing device 700 also includes input devices 710 and output devices 714. The input device 710 can include one input device or multiple input devices. Examples of the input devices can include a mouse, a keyboard, a touchpad, a microphone, or a touch-screen display. The output devices 714 can include one output device or multiple output devices. Examples of the output devices can include a display device, a speaker, or a haptic actuator. Examples of the display device can include a liquid crystal display (LCD) or a light-emitting diode (LED) display.

While FIG. 7 depicts the components (e.g., processor 702, memory 704, and output devices 714) as being internal to a single housing, in other examples the components may be distributed and in wired or wireless communication with one another. For example, the output devices 714 can include a computer monitor or television that is separate from and in communication with the computing device 700 that performs the main processing. And although FIG. 7 depicts a certain number and arrangement of components, this is for illustrative purposes and not intended to be limiting. Other examples can include more components, fewer components, different components, or a different arrangement of the components shown in FIG. 7.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

The invention claimed is:

1. A system comprising:
one or more processors; and
one or more memories including instructions executable by the one or more processors for causing the one or more processors to:
  receive a request for a beverage transmitted by a software application, the request indicating that a requestor of the beverage is to receive the beverage in a personal receptacle;
  determine that the requestor is to receive the beverage in the personal receptacle at a production location based on information included in the request;
  based on determining that the requestor is to receive the beverage in the personal receptacle at the production location, generate a digital instruction to create the beverage based on the request, the digital instruction including a name associated with the requestor, and the digital instruction including a modification to the name to indicate that the beverage is to be provided to the requestor in the personal receptacle; and
  output a beverage build instruction corresponding to the digital instruction, the beverage build instruction being configured to cause an entity at the production location to create the beverage and provide the beverage to the requestor in the personal receptacle.

2. The system of claim 1, wherein the one or more memories further include instructions executable by the one or more processors for causing the one or more processors to:
receive the request over a network from a user device executing the software application, wherein the user device is remote from the production location, and wherein the requestor is a user of the user device.

3. The system of claim 1, wherein the one or more memories further include instructions executable by the one or more processors for causing the one or more processors to:
receive the request from a kiosk executing the software application at the production location, wherein the requestor is a user of the kiosk.

4. The system of claim 1, wherein the software application includes a graphical user interface, the graphical user interface including:
user interface elements corresponding to a plurality of beverage choices; and
a graphical option that is selectable for receiving the beverage in the personal receptacle.

5. A method comprising:
receiving, by one or more processors, a request for a beverage transmitted by a software application, the request indicating that a requestor of the beverage is to receive the beverage in a personal receptacle;
generating, by the one or more processors, a digital instruction to create the beverage based on the request, the digital instruction being configured to prevent the beverage from being dispensed in a single-use container and to cause the beverage to be provided to the requestor in the personal receptacle;
outputting, by the one or more processors, a beverage build instruction corresponding to the digital instruction;
starting, by one or more employees at a production location, to create the beverage in a reusable container based on the beverage build instruction, wherein the one or more employees start creating the beverage prior to physically receiving the personal receptacle from the requestor;
subsequent to starting to create the beverage, receiving, by the one or more employees, the personal receptacle from the requestor;
pouring, by the one or more employees, the beverage from the reusable container into the personal receptacle of the requestor;
providing, by the one or more employees, the beverage to the requestor in the personal receptacle;
washing, by the one or more employees, the reusable container; and
after washing the reusable container, using, by the one or more employees, the reusable container for preparing another beverage for another recipient.

6. The method of claim 5, further comprising:
determining that the requestor is to receive the beverage in the personal receptacle at the production location based on information included in the request; and
based on determining that the requestor is to receive the beverage in the personal receptacle at the production location, incorporating an indication into the digital instruction, the indication including textual data or image data that is within the request transmitted by the software application.

7. The method of claim 6, wherein the request includes a name associated with the requestor, and wherein the indication is a modification to the name to indicate that the beverage is to be provided to the requestor in the personal receptacle.

8. The method of claim 5, further comprising outputting the beverage build instruction on a display device.

9. The method of claim 5, wherein the software application includes a graphical user interface, the graphical user interface including:
user interface elements corresponding to a plurality of beverage choices; and
a graphical option that is selectable for receiving the beverage in the personal receptacle.

10. The method of claim 5, further comprising:
receive audio input from requestors via an intercom system, the audio input including requests for beverages from the requestors and indicating that the requestors are to receive the beverages in personal receptacles of the requestors;
generating, by the one or more processors, digital instructions to create the beverages, the digital instructions including indications that the beverages are to be provided to the requestors in the personal receptacles; and outputting, by the one or more processors, beverage build instructions corresponding to the digital instructions, the beverage build instructions indicating that an entity is to create the beverages and provide the beverages to the requestors in the personal receptacles.

11. The method of claim 5, further comprising:

providing, by the one or more employees at the production location, a vessel to the requestor, wherein the requestor inserts the personal receptacle into the vessel, the vessel being distinct from the personal receptacle;

receiving, by the one or more employees at the production location, the vessel with the personal receptacle therein from the requestor;

pouring, by the one or more employees at the production location, the beverage into the personal receptacle; and providing, by the one or more employees at the production location, the vessel containing the personal receptacle with the beverage back to the requestor, wherein the requestor removes the personal receptacle from the vessel prior to departing the production location.

12. A non-transitory computer-readable medium comprising program code that is executable by one or more processors for causing the one or more processors to:

receive a request for a beverage transmitted by a software application executable on a user device, the request indicating that a user of the user device selected a graphical option in a graphical user interface of the software application to receive the beverage in a personal receptacle of the user;

generate a digital instruction to create the beverage based on the request, the digital instruction being configured to cause the beverage to be provided to the user in the personal receptacle; and controlling a printer at a production location to print a beverage build instruction corresponding to the digital instruction, the beverage build instruction being configured to cause an entity at the production location to create the beverage and provide the beverage to the user in the personal receptacle, wherein the printed beverage build instruction includes an indication that the beverage is to be provided in the personal receptacle of the user.

13. The non-transitory computer-readable medium of claim 12, further comprising program code that is executable by the one or more processors for causing the one or more processors to:

determine that the user is to receive the beverage in the personal receptacle based on information included in the request; and based on determining that the user is to receive the beverage in the personal receptacle, incorporate the indication into the digital instruction, the indication including textual data or image data that is not within the request transmitted by the software application.

14. The non-transitory computer-readable medium of claim 12, wherein the personal receptacle is a cup.

15. The non-transitory computer-readable medium of claim 12, further comprising program code that is executable by the one or more processors for causing the one or more processors to:

receive the request over a network from the user device executing the software application, wherein the user device is remote from the production location.

16. The non-transitory computer-readable medium of claim 12, further comprising program code that is executable by the one or more processors for causing the one or more processors to:

generate one or more aspects of the graphical user interface and provide the one or more aspects to the user device via a network.

17. The non-transitory computer-readable medium of claim 12, wherein the graphical user interface includes a plurality of user interface elements corresponding to a plurality of beverage choices.

* * * * *